(12) United States Patent
Sander

(10) Patent No.: US 12,036,447 B2
(45) Date of Patent: *Jul. 16, 2024

(54) GOLF CLUB HEAD WITH POLYMERIC HOSEL

(71) Applicant: Karsten Manufacturing Corporation, Phoenix, AZ (US)

(72) Inventor: Raymond J. Sander, Benbrook, TX (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/661,904

(22) Filed: May 3, 2022

(65) Prior Publication Data

US 2022/0258013 A1 Aug. 18, 2022

Related U.S. Application Data

(60) Continuation of application No. 17/009,637, filed on Sep. 1, 2020, now Pat. No. 11,318,356, which is a continuation of application No. 16/432,776, filed on Jun. 5, 2019, now Pat. No. 10,758,787, which is a continuation of application No. 15/812,375, filed on Nov. 14, 2017, now Pat. No. 10,350,462, which is a division of application No. 14/724,373, filed on May 28, 2015, now Pat. No. 9,849,347.

(51) Int. Cl.
| | |
|---|---|
| *A63B 53/02* | (2015.01) |
| *A63B 53/04* | (2015.01) |
| *B29C 45/00* | (2006.01) |
| *B29K 77/00* | (2006.01) |
| *B29K 307/04* | (2006.01) |
| *B29L 31/52* | (2006.01) |

(52) U.S. Cl.
CPC .............. *A63B 53/02* (2013.01); *A63B 53/04* (2013.01); *B29C 45/0005* (2013.01); *A63B 53/0408* (2020.08); *A63B 2209/02* (2013.01); *B29K 2077/00* (2013.01); *B29K 2307/04* (2013.01); *B29L 2031/5227* (2013.01)

(58) Field of Classification Search
CPC ..... A63B 53/02; A63B 53/04; A63B 53/0408; A63B 2209/02; B29C 45/0005; B29K 2077/00; B29K 2307/04; B29L 2031/5227
See application file for complete search history.

(56) References Cited

U.S. PATENT DOCUMENTS

| | | | |
|---|---|---|---|
| 3,571,900 A * | 3/1971 | Hardesty | A63B 60/00 425/577 |
| 3,598,693 A | 8/1971 | Andersen et al. | |
| 4,121,832 A | 10/1978 | Ebbing | |
| | (Continued) | | |

OTHER PUBLICATIONS

International Search Report and Written Opinion dated Jul. 11, 2016 for PCT Application No. PCT/US2016/025854, filed Apr. 4, 2016.

Primary Examiner — Michael D Dennis

(57) ABSTRACT

A golf club head includes a face, a club head body, and a hosel. The hosel has a tubular hosel body extending along a longitudinal axis and defining a bore. The bore is configured to receive a golf club shaft or a shaft adapter. The tubular hosel body is molded from a polymeric material that includes a resin and a plurality of fibers, each fiber has a length of from about 0.01 mm to about 12 mm.

20 Claims, 1 Drawing Sheet

(56) References Cited

U.S. PATENT DOCUMENTS

| | | | |
|---|---|---|---|
| 4,664,383 A * | 5/1987 | Aizawa | A63B 60/00 273/DIG. 7 |
| 5,454,563 A | 10/1995 | Nagamoto | |
| 5,601,498 A | 2/1997 | Antonious | |
| 5,692,970 A | 12/1997 | Nelson | |
| 5,843,568 A * | 12/1998 | Masui | B29C 44/586 264/45.2 |
| 6,146,286 A * | 11/2000 | Masuda | A63B 53/10 473/305 |
| 7,549,933 B2 * | 6/2009 | Kumamoto | A63B 53/0466 473/348 |
| 7,862,448 B2 | 1/2011 | Tanio | |
| 9,050,506 B2 | 6/2015 | Boyd et al. | |
| 9,283,448 B2 | 3/2016 | Sander | |
| 9,296,175 B2 | 3/2016 | Yamaguchi | |
| 9,387,369 B2 | 7/2016 | Yamamoto | |
| 9,403,071 B2 | 8/2016 | Sander | |
| 9,468,816 B2 | 10/2016 | Barelmann | |
| 2002/0166595 A1 * | 11/2002 | Lindsay | A63B 60/08 138/125 |
| 2003/0161989 A1 * | 8/2003 | Funakoshi | B29C 44/586 428/317.9 |
| 2007/0270237 A1 | 11/2007 | Tavares et al. | |
| 2013/0337253 A1 * | 12/2013 | Yamaguchi | B32B 5/145 264/328.18 |
| 2014/0357398 A1 * | 12/2014 | Yamamoto | A63B 60/00 473/305 |
| 2016/0332040 A1 | 11/2016 | Lafortune | |

* cited by examiner

GOLF CLUB HEAD WITH POLYMERIC HOSEL

CROSS-REFERENCES

This is a continuation of U.S. patent application Ser. No. 17/009,637, filed on Sep. 1, 2020, now U.S. Pat. No. 11,318,356 which is a continuation of U.S. patent application Ser. No. 16/432,776, filed on Jun. 5, 2019, now U.S. Pat. No. 10,758,787 issued on Sep. 1, 2020, which is a continuation of U.S. patent application Ser. No. 15/812,375, filed Nov. 14, 2017, now U.S. Pat. No. 10,350,462 issued on Jul. 16, 2019, which is a divisional of U.S. patent application Ser. No. 14/724,373, filed May 28, 2015, now U.S. Pat. No. 9,849,347 issued Dec. 26, 2017, all of which are incorporated herein by reference in their entirety.

TECHNICAL FIELD

The present invention relates generally to a golf club head having a polymeric hosel.

BACKGROUND

A golf club may generally include a club head disposed on the end of an elongate shaft. During play, the club head may be swung into contact with a stationary ball located on the ground in an effort to project the ball in an intended direction and with a desired vertical trajectory.

Many design parameters must be considered when forming a golf club head. For example, the design must provide enough structural resilience to withstand repeated impact forces between the club and the ball, as well as between the club and the ground. The club head must conform to maximum size requirements set by different rule setting associations, and the face of the club must not have a coefficient of restitution above a predefined maximum (measured according to applicable standards). Assuming that certain predefined design constraints are satisfied, a club head design is typically quantified by the magnitude and location of the center of gravity, as well as the head's moment of inertia about the center of gravity and/or the shaft.

The club's moment of inertia relates to the club's resistance to rotation (particularly during an off-center hit), and is often perceived as the club's measure of "forgiveness." In typical driver designs, high moments of inertia are desired to reduce the club's tendency to push or fade a ball. Achieving a high moment of inertia generally involves placing mass as close to the perimeter of the club as possible (to maximize the moment of inertia about the center of gravity), and as close to the toe as possible (to maximize the moment of inertia about the shaft).

While the moment of inertia affects the forgiveness of a club head, the location of the center of gravity behind the club face (and above the sole) generally affects the trajectory of a shot for a given face loft angle. A center of gravity that is positioned as far rearward (away from the face) and as low (close to the sole) as possible typically results in a ball flight that has a higher trajectory than a club head with a center of gravity placed more forward and/or higher.

While a high moment of inertia is obtained by increasing the perimeter weighting of the club head, an increase in the total mass/swing weight of the club head (i.e., the magnitude of the center of gravity) has a strong, negative effect on club head speed and hitting distance. Said another way, to maximize club head speed (and hitting distance), a lower total mass is desired; however a lower total mass generally reduces the club head's moment of inertia (and forgiveness).

In the tension between swing speed (mass) and forgiveness (moment of inertia), it may be desirable to place varying amounts of mass in specific locations throughout the club head to tailor a club's performance to a particular golfer or ability level. In this manner, the total club head mass may generally be categorized into two categories: structural mass and discretionary mass.

Structural mass generally refers to the mass of the materials that are required to provide the club head with the structural resilience needed to withstand repeated impacts. Structural mass is highly design-dependent, and provides a designer with a relatively low amount of control over specific mass distribution. On the other hand, discretionary mass is any additional mass that may be added to the club head design for the sole purpose of customizing the performance and/or forgiveness of the club. In an ideal club design, the amount of structural mass would be minimized (without sacrificing resiliency) to provide a designer with a greater ability to customize club performance, while maintaining a swing weight that is expected by the consumer.

SUMMARY

A golf club head includes a face, a club head body, and a hosel. The hosel has a tubular hosel body extending along a longitudinal axis and defining a bore. The bore is configured to receive a golf club shaft or a shaft adapter. The tubular hosel body is molded from a polymeric material that includes a resin and a plurality of fibers, each fiber has a length of from about 0.01 mm to about 12 mm.

In one configuration, a method of manufacturing a polymeric hosel for a golf club head includes molding a tubular hosel body from a polymeric material. The tubular hosel body is molded about a longitudinal axis and defines a bore configured to receive a golf club shaft or a shaft adapter. Additionally, the polymeric material comprises a resin and a plurality of fibers that each have a length of from about 0.01 mm to about 12 mm. The resin is preferably of thermoplastic, and may be a carbon-filled polyamide.

The above features and advantages and other features and advantages of the present invention are readily apparent from the following detailed description of the best modes for carrying out the invention when taken in connection with the accompanying drawings.

DETAILED DESCRIPTION

Figure 1:
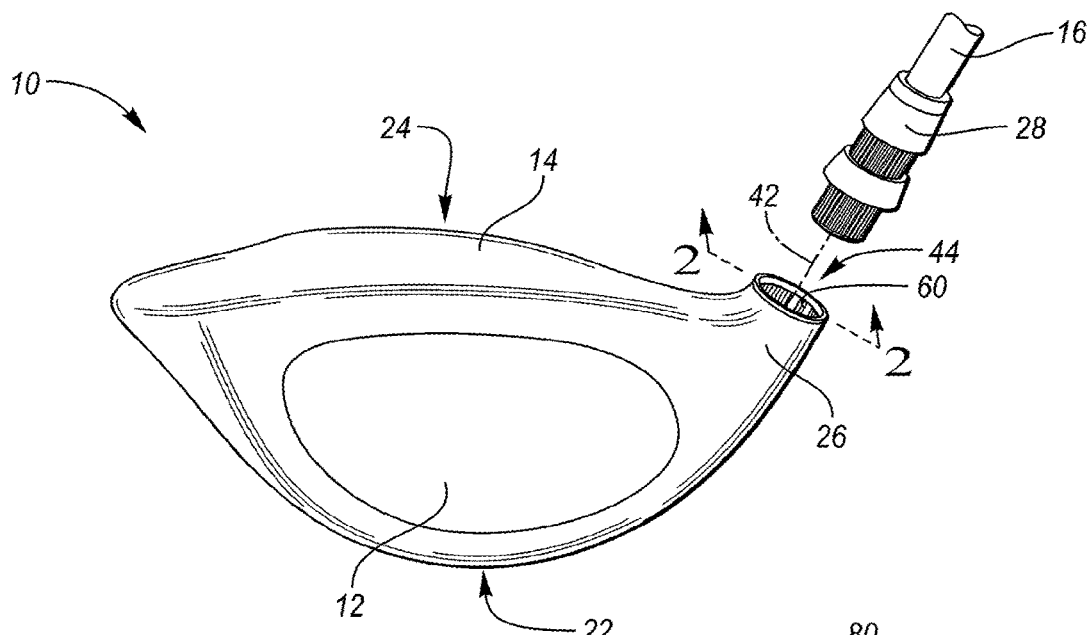
FIG. 1 is a schematic front view of a golf club having a detachable face.

Referring to the drawings, wherein like reference numerals are used to identify like or identical components in the various views, FIG. 1 illustrates a schematic perspective view of a wood-type golf club head 10 (i.e., "club head 10") that generally includes a face portion 12 (i.e., the "face 12") and a body portion 14 (i.e., the "body 14"). As generally illustrated in FIG. 1, the club head 10 may be mounted on the end of an elongate shaft 16, which may be gripped and swung by a user to impart a generally arcuate motion to the club head 10.

The face 12 of the club head 10 generally forms the leading surface of the club head 10 and has a slight convex/arcuate curvature that extends out from the club head 10. In one embodiment, the curvature (i.e., bulge and/or roll) of the face 12 has a radius of from about 7 inches to about 20 inches. Additionally, as is commonly understood, the face 12 may be disposed at an angle to a vertical plane when the club is held in a neutral hitting position. This angle may be generally referred to as the loft angle or slope of the club. Wood-type club heads (including hybrid woods), such as illustrated in FIG. 1, may most commonly have a loft angle of from about 8.5 degrees to about 24 degrees, though other loft angles are possible and have been commercially sold.

The body 14 of the club head 10 may generally be configured to support the face 12 and to aid in coupling the face 12 to the elongate shaft 16. The face 12 may be secured to the body 14, for example, through the use of adhesives, mechanical fasteners 30, or welding (i.e., if similar materials are used for the face 12 and body 14). Because an impact with a ball can generate considerably large stresses near the point of impact, in one configuration, the face 12 may be formed from one or more metallic materials that are suitable to withstand any expected impact loading. Examples of suitable materials may include, but are not limited to, various alloys of stainless steel or titanium.

Referring again to FIG. 1, the body 14 may generally include a lower portion 22 (i.e., a "sole 22") and an upper portion 24 (i.e., a "crown 24"). For the purpose of this description, the crown 24 may meet the sole 22 where the surface has a vertical tangent when the club head 10 is held in a neutral hitting position (i.e., a position where the shaft 16 is maintained entirely in a vertical plane and at a prescribed lie angle relative to a horizontal ground plane). Finally, the club head 10 includes a hosel 26 that is configured to receive the golf club shaft 16 or a suitable shaft adapter 28.

To reduce structural mass beyond what is economically viable with metal alloys, the body 14 of the club head 10 may be formed from a polymeric material. The comparatively low density nature of polymeric materials also permits greater design flexibility, at less of a structural weight penalty, than similar designs made from metal. In one configuration, the desired design flexibility may be achieved by molding the polymeric material into shape using a molding technique, such as, injection molding, compression molding, blow molding, thermoforming or the like. To provide the maximum design flexibility, the preferred molding technique is injection molding.

While weight savings and design flexibility are important, the polymeric material must still be strong enough to withstand the stress that is experienced when the club head 10 impacts a ball. This may be accomplished through a combination of structural and material design choices. With regard to material selection, it is preferable to use a moldable polymeric material that has a tensile strength of greater than about 200 MPa (according to ASTM D638), or more preferably greater than about 250 MPa.

In one embodiment, the body 14 may be formed from a polymeric material that comprises a resin and a plurality of discontinuous fibers (i.e., "chopped fibers"). The discontinuous/chopped fibers may include, for example, chopped carbon fibers or chopped glass fibers and are embedded within the resin prior to molding the body 14. In one configuration, the polymeric material may be a "long fiber thermoplastic" where the discontinuous fibers are embedded in a thermoplastic resin and each have a designed fiber length of from about 3 mm to about 12 mm. In another configuration, the polymeric material may be a "short fiber thermoplastic" where the discontinuous fibers are similarly embedded in a thermoplastic resin, though may each have a designed length of from about 0.01 mm to about 3 mm. In either case, the fiber length may be affected by the molding process, and due to breakage, some may be shorter than the described range. Additionally, in some configurations, discontinuous chopped fibers may be characterized by an aspect ratio (e.g., length/diameter of the fiber) of greater than about 10, or more preferably greater than about 50, and less than about 1500. Regardless of the specific type of discontinuous chopped fibers used, the material may have a fiber length of from about 0.01 mm to about 12 mm and a resin content of from about 40% to about 90% by weight, or more preferably from about 55% to about 70% by weight.

One suitable material may include a thermoplastic polyamide (e.g., PA6 or PA66) filled with chopped carbon fiber (i.e., a carbon-filled polyamide). Other resins may include certain polyimides, polyamide-imides, polyetheretherketones (PEEK), polycarbonates, engineering polyurethanes, and/or other similar materials.

In one configuration, the body 14 may be entirely molded through a single process. If complex geometries are desired, molding techniques such as lost core molding or injection molding with collapsible slides may be used to form any internal recesses or cavities. In another configuration, instead of a unitary design, the body 14 may be formed as two or more portions that are subsequently joined together. Such a multi-piece design may reduce the complexity of the molding process, but may add additional manufacturing steps to fuse the components together.

Figure 2:
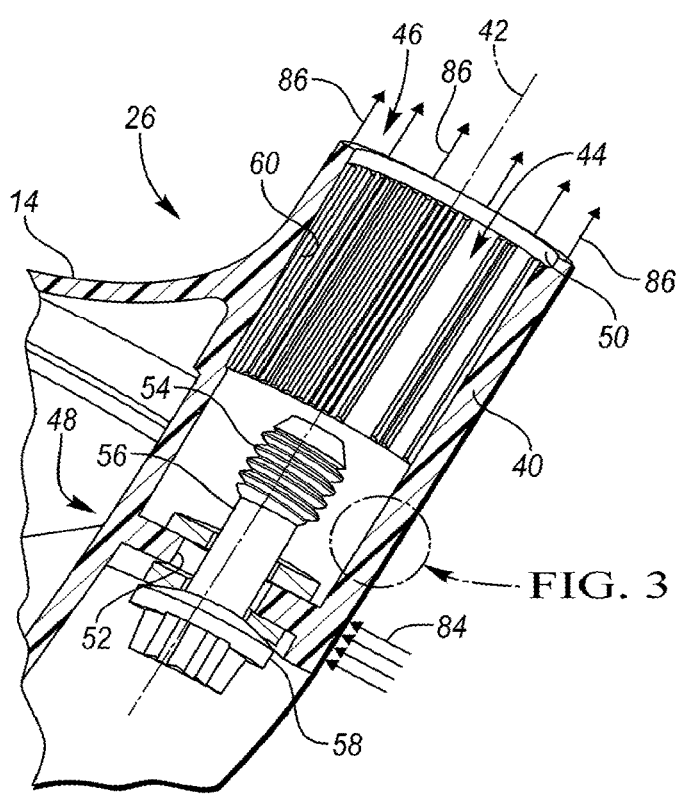
FIG. 2 is a schematic partial cross-sectional view of the hosel of FIG. 1, taken along line 2-2.

Referring to FIG. 2, the hosel 26 generally includes a tubular hosel body 40 that is aligned along a longitudinal axis 42 and that defines a central bore 44 that is configured to receive the shaft 16 or shaft adapter 28. If the hosel body 40 is configured to directly receive the shaft 16, the bore 44 may have a diameter of from about 8.5 mm to about 9.5 mm. If instead, the hosel body 40 is configured to receive a shaft adapter 28, the bore 44 may have a diameter of from about 8.5 mm to about 20 mm, or from about 10 mm to about 15 mm. Additionally, the bore 44 may have a depth, measured along the longitudinal axis 42, of from about 20 mm to about 40 mm, or from about 25 mm to about 35 mm.

As shown, the tubular hosel body 40 generally extends between a first end 46 and a second end 48. The first end 46 defines a first opening 50 through which the golf club shaft 16 or shaft adapter 28 may be inserted into the bore 44. The first opening 50 may have a similar diameter as the bore, or may define a slightly larger and/or chamfered ingress surface. In one configuration, the second end 48 may define a second opening 52 that has a smaller diameter than the first opening 50. The second opening 52 may, for example, be dimensioned to allow a threaded portion 54 of a screw 56 to extend into the bore 44, but may prevent a head 58 of the screw 56 from entering. The screw 56 may be operative to secure an end of the shaft 16 or shaft adapter 28 to the second end 48 of the tubular hosel body 40 such that the shaft 16 or shaft adapter 28 is restrained from being withdrawn from the bore 44.

In one configuration, an internal surface 58 of the hosel body 40 may include a plurality of splines 60. The plurality of splines 60 may be directly adjacent to the first end 46, and may be operative to inhibit relative rotation between the shaft 16 or shaft adapter 28 and the hosel body 40 when the shaft 16 or shaft adapter 28 is inserted into the bore 44. Each respective spline 60 may have a height or depth of, for example, from about 0.25 mm to about 0.5 mm.

To further reduce the structural weight of the golf club head 10, the hosel 26, and specifically the tubular hosel body 40, may be molded from a polymeric material that includes both a resin and a plurality of discontinuous/chopped fibers. The chopped fibers may include chopped carbon fibers or chopped glass fibers and are embedded within the resin prior to molding the body 14. In one configuration, the polymeric material used to form the hosel body 40 may be a "long fiber thermoplastic" or a "short fiber thermoplastic" that desirably has a fiber length of from about 0.01 mm to about 12 mm and a resin content of from about 40% to about 90% by weight, or more preferably from about 55% to about 70% by weight.

One suitable material for the hosel body 40 may include a thermoplastic polyamide (e.g., PA6 or PA66) filled with chopped carbon fiber (i.e., a carbon-filled polyamide). Other resins may include certain polyimides, polyamide-imides, polyetheretherketones (PEEK), polycarbonates, engineering polyurethanes, and/or other similar materials.

Because the hosel 26 is generally a high-stress portion of the club head 10, it is important to ensure that the design of the polymeric hosel is strong enough to repeatedly withstand expected impact forces. To provide an optimized design that achieves the required strength at the lowest possible weight, it is preferable to align as many of the embedded reinforcing fibers in a parallel orientation with the longitudinal axis 42 as possible. While it is not likely possible to achieve 100% of the fibers in perfect alignment, it is preferable to achieve a fiber orientation throughout the hosel body 40 where at least 50% of the fibers have an average longitudinal orientation within about 30 degrees of parallel to the longitudinal axis 42 of the bore 44. In other, even more preferred embodiments, at least 60% of the fibers are oriented within about 20 degrees of parallel, or at least 70% of the fibers are oriented within about 10 degrees of parallel to the longitudinal axis 42.

Figure 3:
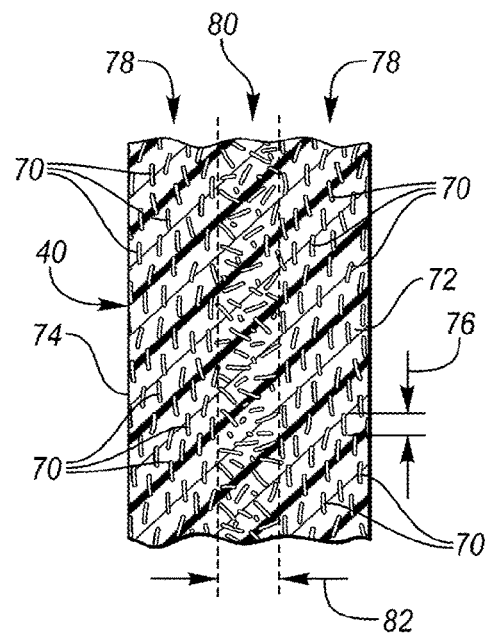
FIG. 3 is a schematic enlarged view of a portion of the area marked "FIG. 3" provided in FIG. 2, illustrating embedded fiber orientation.

FIG. 3 schematically illustrates a plurality of chopped fibers 70 embedded within a polymer resin 72 to form the wall 74 of the hosel body 40. As shown, each fiber 70 may have a length 76 that is from about 0.01 mm to about 12 mm (note that the illustrated fibers are not necessarily illustrated to scale in either size or density). During a molding process, such as injection molding, embedded fibers 70 tend to align with a direction of the flowing polymer. With some fibers (i.e., particularly with short fiber thermoplastics) and resins, the alignment tends to occur more completely close to the walls of the mold or edge of the part. These layers are referred to as shear layers 78 or skin layers. Conversely, within a central core layer 80, the fibers 70 can sometimes be more randomized and/or perpendicular to the flowing polymer. In these embodiments, the thickness 82 of the core layer 80 can be altered by various molding parameters including molding speed (i.e., slower molding speed can yield a thinner core layer 80) and mold design. With the present design, it is desirable to minimize the thickness 82 of any randomized core layer 80.

To align the most number of fibers 70 in a parallel orientation with the longitudinal axis 42 of the bore 44, it may be desirable to mold the hosel body 40 with a mold flow that is also parallel with the longitudinal axis 42. In one embodiment, this may be achieved by gating a corresponding mold proximate to the second end 48 of the hosel body 40 and venting the mold proximate to the first end 46. For example, as shown in FIG. 2, the hosel body 40 may be gated at 84 and vented at 86. Such a mold design would allow the polymeric material to encircle the second end 48 to form the ledge 88, after which it may uniformly flow toward the first end 46.

In this design, the splines 60 may be integrally molded with the tubular hosel body 40. Additionally, the hosel 26 may be either integrally molded with the body 14, or could be separately molded and attached via a joining method such as welding or adhering.

In one configuration, a method of manufacturing a polymeric hosel 26 for a golf club head 10 includes molding a tubular hosel body 40 from a polymeric material. The tubular hosel body 40 is molded about a longitudinal axis 42 and defines a bore 44 configured to receive a golf club shaft 16 or a shaft adapter 28. Additionally, the polymeric material comprises a resin 72 and a plurality of fibers 70 that each have a length 76 of from about 0.01 mm to about 12 mm. The resin is preferably of thermoplastic, and may be a carbon-filled polyamide.

Molding the tubular hosel body 40 may include injecting the polymeric material into a mold such that it flows from a first end 46 of the tubular hosel body 40 to a second end of the tubular hosel body 48. To promote a more uniform flow, the mold may be vented at the second end 48 of the tubular hosel body 40. In one configuration, at least 50% of the plurality of fibers to be oriented within about 30 degrees of parallel to the longitudinal axis of the bore.

When formed in this manner, the hosel 26 may avoid any need for metallic inserts to be secured within the bore 44 or for ancillary metallic hosel supports. Testing of a molded polymeric hosel 26 with a splined, polymeric shaft adapter 28 passed multiple durability tests, performed cumulatively on the same hosel 26, without any signs of compromised hosel integrity or significant wear. The cumulative testing included 3000 impacts (of progressively increasing speed) between the face 12 and a golf ball, followed by robot swing testing, and numerous insertion/removal cycles of the shaft adapter 28.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

The invention claimed is:

1. A golf club head comprising:
a face, a club head body, and a hosel;
wherein the club head body and the hosel are entirely molded through a single molding process;
wherein the hosel includes a tubular hosel body having a hosel longitudinal axis and defining a bore configured to receive a golf club shaft or a shaft adapter;
wherein the club head body and the tubular hosel body are injection molded from a polymeric material comprising a resin and a plurality of discontinuous fibers;
wherein the tubular hosel body consists of a wall having an inner shear layer, a central core layer, an outer shear layer; and a plurality of rotation inhibiting structures integrally molded with the tubular hosel body and located on an internal surface of the tubular hosel body;
wherein the tubular hosel body has a first end and a second end;
wherein at least 50% of the plurality of discontinuous fibers of the tubular hosel body are oriented within about 30 degrees of parallel to the hosel longitudinal axis in the inner shear layer and in the outer shear layer;
wherein the plurality of discontinuous fibers of the tubular hosel body in the central core layer are randomized or perpendicular to the hosel longitudinal axis;
wherein the plurality of rotation inhibiting structures comprise a plurality of splines directly adjacent to the first end;
wherein the plurality of splines are operative to inhibit rotation of the golf club shaft or the shaft adapter following insertion into the bore;
wherein the polymeric material has a tensile strength greater than 200 MPa.

2. The golf club head of claim 1, wherein each of the plurality of discontinuous fibers has a length of from about 0.01 mm to about 12 mm.

3. The golf club head of claim 1, wherein each of the plurality of discontinuous fibers has an aspect ratio in a range from 10 to 1500;
wherein the aspect ratio is a ratio of length to diameter of each of the plurality of discontinuous fibers.

4. The golf club head of claim 1, wherein the bore has a diameter of from about 8.5 mm to about 20 mm, and a length of from about 25 mm to about 35 mm.

5. The golf club head of claim 1, wherein the first end defines a first opening that permits the golf club shaft or the shaft adapter to be inserted into the bore; and
wherein the second end defines a second opening that is smaller than the first opening, and wherein the second opening is operative to permit a threaded portion of a screw to extend through the second end into the bore.

6. The golf club head of claim 1, wherein the polymeric material is from about 55% to 70% resin by weight.

7. The golf club head of claim 1, wherein the polymeric material is from about 40% to about 90% resin by weight.

8. The golf club head of claim 1, wherein the resin is a thermoplastic polymer.

9. The golf club head of claim 1, wherein the polymeric material is a carbon-filled polyamide.

10. The golf club head of claim 1, wherein the each of the plurality of discontinuous fibers has a length of from about 0.01 mm to about 3 mm.

11. The golf club head of claim 1, wherein at least 60% of the plurality of discontinuous fibers of the tubular hosel body are oriented within about 20 degrees parallel to the hosel longitudinal axis in the inner shear layer and in the outer shear layer.

12. The golf club head of claim 1, wherein at least 70% of the plurality of discontinuous fibers of the tubular hosel body are oriented within about 10 degrees parallel to the hosel longitudinal axis in the inner shear layer and in the outer shear layer.

13. A golf club comprising:
a golf club head, a golf club shaft, and a grip;
wherein the golf club head further comprises:
a face, a club head body, and a hosel;
wherein the club head body and the hosel are entirely molded through a single molding process;
wherein the hosel includes a tubular hosel body having a hosel longitudinal axis and defining a bore configured to receive the golf club shaft or a shaft adapter;
wherein the club head body and the tubular hosel body are injection molded from a polymeric material comprising a resin and a plurality of discontinuous fibers;
wherein the tubular hosel body consists of a wall having an inner shear layer, a central core layer, an outer shear layer; and a plurality of rotation inhibiting structures integrally molded with the tubular hosel body and located on an internal surface of the tubular hosel body;
wherein the tubular hosel body has a first end and a second end;
wherein at least 50% of the plurality of discontinuous fibers of the tubular hosel body are oriented within about 30 degrees of parallel to the hosel longitudinal axis in the inner shear layer and in the outer shear layer;
wherein the plurality of discontinuous fibers of the tubular hosel body in the central core layer are either randomized or perpendicular to the hosel longitudinal axis;
wherein the plurality of rotation inhibiting structures comprise a plurality of splines directly adjacent to the first end;
wherein the plurality of splines are operative to inhibit rotation of the golf club shaft or the shaft adapter following insertion into the bore.

14. The golf club of claim 13, wherein the polymeric material has a tensile strength greater than 200 MPa.

15. The golf club of claim 13, wherein each of the plurality of discontinuous fibers has a length of from about 0.01 mm to about 12 mm.

16. The golf club of claim 13, wherein each of the plurality of discontinuous fibers has an aspect ratio in a range from 10 to 1500;
wherein the aspect ratio is a ratio of length to diameter of each of the plurality of discontinuous fibers.

17. The golf club of claim 13, wherein the bore has a diameter of from about 8.5 mm to about 20 mm, and a length of from about 25 mm to about 35 mm.

18. The golf club of claim 13, wherein the first end defines a first opening that permits the golf club shaft or the shaft adapter to be inserted into the bore; and
wherein the second end defines a second opening that is smaller than the first opening, and wherein the second opening is operative to permit a threaded portion of a screw to extend through the second end into the bore.

19. The golf club of claim 13, wherein the polymeric material is from about 40% to about 90% resin by weight.

20. The golf club of claim 13, wherein the resin is a thermoplastic polymer.

* * * * *